(12) United States Patent
O'Loughlin et al.

(10) Patent No.: US 6,483,076 B1
(45) Date of Patent: Nov. 19, 2002

(54) METHOD OF POSITIONING A WORKPIECE FOR OPTIMAL PROCESSING

(75) Inventors: Mark E. O'Loughlin, Galloway, OH (US); Steven M. Toller, Dublin, OH (US); Jeff L. Dulaney, Dublin, OH (US)

(73) Assignee: LSP Technologies, INC, Dublin, OH (US)

( * ) Notice: Subject to any disclaimer, the term of this patent is extended or adjusted under 35 U.S.C. 154(b) by 0 days.

(21) Appl. No.: 09/564,360

(22) Filed: May 2, 2000

(51) Int. Cl.⁷ .............................................. B23K 26/00
(52) U.S. Cl. ...................................... 219/121.85; 72/53
(58) Field of Search ..................... 219/121.83, 121.76, 219/121.73, 121.85, 121.69; 72/19.6, 53; 73/11.02; 148/525

(56) References Cited

U.S. PATENT DOCUMENTS

| | | | | |
|---|---|---|---|---|
| 5,741,559 A | * | 4/1998 | Dulaney | |
| 5,948,293 A | * | 9/1999 | Somers et al. | |
| 6,127,649 A | * | 10/2000 | Toller et al. | |
| 6,130,400 A | * | 10/2000 | Rockstroh | |
| 6,191,385 B1 | * | 2/2001 | O Loughlin et al. | |
| 6,236,016 B1 | * | 5/2001 | Dulaney et al. | |
| 6,254,703 B1 | * | 7/2001 | Sokol et al. | |

* cited by examiner

Primary Examiner—Tom Dunn
Assistant Examiner—Jonathan Johnson
(74) Attorney, Agent, or Firm—Randall J. Knuth (57) ABSTRACT

A method of producing a workpiece involves positioning the workpiece at a current processing position indicated by a hard-coded part program and then collecting position data which defines the positional arrangement of a current target area of the workpiece. The collected position data is processed by comparing it to reference position information that represents the positional arrangement of the same target area in an ideal workpiece employed in the development of the part program. The position of the workpiece (and hence the target area) is adjusted in accordance with the comparison results. A laser shock processing operation is performed on the workpiece at the current target area following the position adjustment step.

46 Claims, 3 Drawing Sheets

METHOD OF POSITIONING A WORKPIECE FOR OPTIMAL PROCESSING

BACKGROUND OF THE INVENTION

1. Field of the Invention

The present invention relates to a laser shock processing operation, and, more particularly, to a method and apparatus for accurately and automatically tracking the position of a workpiece, such as an integrally bladed rotor, by dynamically adjusting the position of the workpiece in order to compensate for the presence of distortion or manufacturing variations.

2. Description of the Related Art

Laser shock processing, or laser shock peening, or laser peening, as it is also referred to, is a process for producing a region of deep compressive residual stresses imparted by laser pulses directed onto the surface area of a workpiece. Laser shock processing is an effective method of increasing fatigue resistance in metals by treating fatigue critical regions. For a more thorough background in the prior history of laser shock processing, a reference can be made to U.S. Pat. Nos. 5,131,957 and 5,741,559, such patents are explicitly hereby incorporated by reference.

Laser shock processing, as understood in the art and used herein, means utilizing a laser beam from a laser beam source to produce a strong localized compressive force on a portion of a workpiece by producing an explosive force by instantaneous ablation or vaporization of a painted, coated, or un-coated surface. Laser peening has been utilized to create a compressively stressed layer in the subsurface of a workpiece, thereby considerably increasing the resistance of the workpiece to fatigue failure. Laser shock processing typically utilizes two overlays: a transparent overlay (usually water) and an opaque overlay, typically an oil-based, acrylic-based, or water-based paint or tape. Laser shock processing can also utilize only a transparent overlay or bare surface. During processing, a laser beam is directed to pass through the transparent overlay and is absorbed by the opaque overlay or bare surface, causing vaporization of a portion of the opaque overlay or bare surface, which results in rapid plasma formation and the generation of a high amplitude shock wave. The shock wave cold works the surface of the workpiece and creates compressive residual stresses, which provide an increase in fatigue properties of the part. A workpiece may be processed by producing a matrix of overlapping spots that cover the fatigue-critical zone of the part.

Laser shock processing is being used for many applications within gas turbine engines, such as leading and trailing edges of fan and compressor airfoils. These laser peening applications, as well as others, are in need of improved positioning techniques to reduce setup time and improve the quality and consistency of the processed part. The quality of laser peening depends, in part, upon the accurate and repeatable positioning of the laser beam on the part.

Current laser-beam-positioning methods for laser peening parts are accomplished by moving the workpiece to a definite, hard-coded position in space and then firing the laser. The index of this point in space for purposes of identifying the target area can be any convenient feature of the workpiece or part manipulator (reference point), e.g. a corner of the platform of an airfoil, not the coordinates of the point where the laser hits the part, i.e., target area. Consequently, as the reference point of the part (or subsequent similar parts) is moved to the same location, small deformations, distortion, and variations within dimensional tolerances in each individual part (specifically, at or near the target area) will change the exact point where the laser hits the part.

When laser peening thin sections, such gas turbine engine blades, it is usually desirable to use two-sided processing methods and maintain the symmetry of the shockwaves in order to most efficiently and effectively laser peen the part. Typically, matching the shockwaves generated on opposite sides of a thin section is accomplished by maintaining a substantially identical laser spot size and shape on opposite sides of the part for each laser pulse within the spot pattern being processed. If the angles at which the laser beams are presented to the part are maintained as congruent, and the reference point for the part (which can be many inches away from the target area where processing is to occur) is held as constant, small deformations due to previous processing or dissimilarities between parts can cause the laser to hit the part in an asymmetric manner causing improper processing.

Because of the compressive residual stresses imparted by laser peening, small distortions in the part can occur, especially in thin airfoils. Under circumstances where a first series of laser-peened spots causes a slight deformation in the part, the application of a second series of spots over substantially the same target area may result in the beams no longer being disposed substantially opposite one another, depending upon the amount of distortion and the angle on incidence of the laser beams. If the part-positioning program is hard-coded, the operator may never be aware that subsequent series of laser-peened spots were misaligned. These types of in-process misalignment problems can lead to significant variation in the quality and performance of the laser-peened parts, without the operator even realizing the source of the variability.

SUMMARY OF THE INVENTION

According to the present invention there is provided a method for processing a workpiece whereby the laser peening system (or associated hardware or software) automatically detects, and then automatically compensates for, deviations from the ideal positioning of a part. If all parts were identical, the part manipulator could be preprogrammed for the ideal part and each part would then be processed identically, using the same program. However, deviations from the ideal part occur.

By way of background, such deviations or departures from an ideal construction may stem from normal manufacturing tolerances, tolerance or repeatability problems associated with the part fixture that holds the part in the manipulator, distortions caused by earlier laser peening steps on the part, or any other effect that would cause the part to not be positioned in an ideal or pre-determined location relative the laser beam.

Dissimilarities can exist between the workpiece being processed and the template or test workpiece that was used to derive the part processing program. Due to a lack of exact reproducibility in the manufacturing process, the same manufacturing operation can produce a series of workpieces of the same type that have dimensional variations relative to the ideal workpiece, yet still be within manufacturing tolerances. The problem that arises relates to the fact that the part program for controlling the positional movements of the workpieces during laser shock processing is based upon the ideal part construction or a test part that was used during programming; accordingly, any dimensional or structural deviations can result in the laser beam impinging upon the production workpiece in a manner or place different from that contemplated in regard to the ideal workpiece.

Another issue that adversely affects the reliability and repeatability of laser peening arises from the fixturing of the part within the part manipulator. Slight misalignments that may occur during mounting of the part, which may be caused by normal tolerance problems or human errors, can lead to significant misalignment of the laser beam on the part.

Still another issue that adversely affects the reliability and repeatability of laser peening relates to distortion effects that can arise during laser peening because of the compressive residual stresses imparted by the process. Consequently, it is possible that the alignment for subsequent laser peening sequences on a part may be adversely affected by preceding laser-peening sequences. Even if the distortion of the part remains within manufacturing tolerances, the subsequent laser-peening sequences may be ineffectual or even deleterious, if processing continues after a misalignment has occurred.

In view of the foregoing, there is proposed herein a method and apparatus that overcome the disadvantages found in conventional laser shock processing operations.

The processing method of the present invention involves providing a conventional part program that defines a sequence of fixed processing positions, i.e. a preprogrammed spot pattern. At the outset of the processing operation, the workpiece is moved to an initial or first processing position in the part program sequence. Measurements are taken to collect and otherwise acquire workpiece data that defines a spatial parameter characterizing a current target area of the workpiece.

In one form, the spatial parameter represents the distance between the current target area and a reference point such as the base which supports the workpiece. Alternatively, the spatial parameter can define a target area profile which provides a geometric representation of the current workpiece target area. In all cases, the spatial parameter facilitates a comparison between the actual position of the current target area and the ideal position of the same target area as determined in connection with the ideal workpiece construction upon which the part program is based.

The collected workpiece data is processed and otherwise analyzed to evaluate the spatial parameter in relation to predetermined criteria. For example, when the spatial parameter represents a distance measurement, the spatial parameter is compared to a reference distance value that was obtained in connection with the ideal workpiece. Based upon this comparison, a difference value can be obtained which represents the variation of the production workpiece measurement from the ideal workpiece measurement. The position of the workpiece is then adjusted in accordance with the evaluation results to enable reliable, repeatable, and reproducible laser shock processing of the workpiece at the current target area.

After the laser shock processing operation is performed on the workpiece at the current target area, the workpiece is moved to the next sequential target area of the processing positions and the aforecited processing method is repeated until the part program is completed.

The workpiece is typically laser peened by processing a matrix of overlapping or non overlapping laser beam spots that cover a critical zone of interest. Additionally, the same or adjacent areas may be repeatedly processed by cyclically directing the laser pulse to the desired target area. Various parameters may be controlled by the production manager to tailor the laser shock processing operation. For example, among the operational parameters that the designer can select and adjust include (but are not limited to) the location of the incident beam spot, the number of spots at each location, spacing between spots, distance of spots from or to certain workpiece features (e.g., leading and trailing edge of integrally bladed rotor), angle of incidence of the laser beam, and the laser beam metrics (energy, pulse risetime, pulse width, spot shape, etc.). Additional descriptions may be found in U.S. Pat. Nos. 5,741,559 and 5,911,890, both assigned to the same assignee as the present application and incorporated herein by reference thereto.

One significant advantage of laser shock processing is its ability to increase the fatigue properties of the part by selectively imparting compressive residual stresses within certain critical areas where incipient weaknesses or cracks typically appear. The technique has been applied with favorable success to the processing of the pressure and suction sides of leading and trailing edges of fan and compressor airfoils and blades in gas turbine engines.

As used herein, a workpiece refers to any solid body or other suitable material composition that is capable of being treated by laser shock processing. The workpiece may represent a constituent piece forming part of an in-production assembly, a final production article, or any other desired part. Accordingly, the laser shock processing treatment may be applied at any stage of production, i.e., pre- or post-manufacturing or any intervening time. Preferably, in certain industrial applications, the present invention finds significant use in processing the airfoils of an integrally bladed rotor, most notably in the region proximate the leading and trailing edges where flaws and cyclical fatigue failures pose serious problems affecting the performance and durability of the engine.

As used herein, a part program conventionally refers to the sequence of positions where the workpiece is located during each interval or stage of laser shock processing. Typically, the workpiece (or its assembly) is loaded into a part manipulator or other such machine of conventional construction having a control apparatus implemented by a microprocessor. This computing device is preprogrammed with the part program, which contains a predetermined set of instructions representing the various locations where the workpiece is to be positioned and the timing and sequence in which such movements are to take place. The movement of the workpiece is coordinated and otherwise synchronized with the operation of the laser apparatus using a suitable timing and control apparatus or other suitable system management facility.

The part program is typically accompanied by or includes a laser operation program that serves to link or otherwise associate the various workpiece processing positions with corresponding laser shock peening activity characterized by parameters including, but not limited to, pulse number and intensity, angle of incidence, laser-beam spot size, laser-beam spot shape, pulse duration, pulse reforming or reshaping, and pulse modulation.

As used herein, optimal processing refers generally to any form of laser shock processing that produces a desired outcome or result. This result, for example, may be measured or determined by whether the processed article and/or the spot pattern exhibits, meets, or otherwise satisfies predetermined criteria formulated by the designer.

A general aim of such optimization involves the development of shock-induced compressive residual stresses without introducing any distortion into the workpiece.

Alternately, this optimization may be considered to involve the elimination or substantial reduction in the possibility of non-uniformly working the material stemming from a non-uniform application of energy to the workpiece. This non-uniformity may be characterized in a number of ways, for example, asymmetrical shock-induced stress regions, mismatched or unbalanced shock wave activity, misalignment of laser beam spots impacting opposing sides of a workpiece, and misshaped/mismatched laser beam spots incident on opposite sides of the workpiece.

In a preferred form, the optimal processing is characterized by the application of a first laser beam spot to one side of the workpiece and the application of a second laser beam spot to another side of the workpiece, wherein (i) the energy density of the first laser beam spot is substantially equal to the energy density of the second laser beam spot, (ii) the respective sizes and shapes (i.e., areas) of the first laser beam spot and second laser beam spot are substantially equal to one another, and (iii) the respective impact areas represented by the first laser beam spot and second laser beam spot are disposed substantially opposite one another. The same conditions apply when a pattern of spots is desired. Attaining these conditions results in optimal laser shock processing of the workpiece.

However, in view of the fact that the specific selection of laser peening parameters (e.g., spacing between spots, angle of incidence, distance of spots to certain edges) is made in relation to an ideal workpiece that may vary in its construction (i.e., dimensions and geometrical features) from the actual workpiece (namely at the current target area of interest), the ability of the laser shock processing treatment to maintain substantially constant energy densities at opposing sides of the workpiece is compromised due to the potential dissimilarities between the actual and ideal workpieces. Additionally, any fixturing misalignments and part distortion introduced during laser shock processing will also contribute to the difficulty in maintaining proper energy density levels.

Accordingly, even though the workpiece may be moved during processing to precisely track the sequence of positions defined by the part program, the spatial relationship between the intended target areas and the laser beam path is being adversely modified due to the presence of distortions, surface geometry irregularities, and other dissimilarities and variations between the actual and ideal workpieces. As will be discussed herein, the present invention enables the detection of such dissimilarities and distortions in the actual workpiece and provides a position control mechanism that repositions the workpiece such that the current target area is maneuvered into an adjusted position that substantially matches the ideal target area position, thereby reestablishing the original spatial relationship between the laser beam and target area upon which the original part program was developed.

As used herein, a spatial parameter refers to any characteristic of the workpiece that is suitable for, or capable of, measuring or otherwise determining any variations between the position, geometry, or other spatial feature of any selected area of the workpiece (e.g., intended laser peening target area) and a reference position, geometry, or other spatial feature, such as the relevant characteristics which pertain to an ideal workpiece. The spatial parameter must be such as to afford the possibility of enabling the workpiece to be repositioned such that the target area can be accordingly displaced into an adjusted position substantially matching the ideal position defined by the reference data.

For example, the spatial parameter for the actual workpiece can be the measured distance between a feature of the actual workpiece and expected position of the same feature of the actual workpiece, i.e. where the part would be positioned if it were an ideal workpiece. More directly stated, a measurement is made that represents the spatial orientation of the part and the spatial parameter associated with the measured spatial orientation of the actual workpiece is compared to where the actual workpiece is supposed to be. Where the workpiece is "supposed to be" can be determined by empirical measurement of a representative workpiece, but, preferably, is determined through the design of the target area locations on the ideal part. Because the coordinates of the target areas are fixed for a part prior to laser peening and the path of the laser beam is fixed in space, all that is needed is to know where the actual part is positioned with respect to the coordinates of the target areas.

The invention, in one form thereof, is directed to a method of processing a workpiece. According to the method, a workpiece is positioned at a current processing position. Position data is generated that defines at least one spatial parameter that characterizes a positional arrangement of a current target area of the workpiece, wherein the current target area is associated with the current processing position. The position data is processed to evaluate the spatial parameter in relation to predetermined criteria. The position of the workpiece is adjusted in accordance with the evaluation results. Laser shock processing is then performed on the workpiece at the current target area following the position adjustment step. In a preferred form, the steps of the workpiece processing method are repeated for each respective position of a predetermined sequence of positions, such as those of a fixed part program.

The spatial parameter, according to one form thereof, defines a target distance measurement representing the distance between the current target area of the workpiece and a reference point. This target distance measurement is then compared to a predetermined distance value, with the comparison result being used to adjust the position of the workpiece.

Similarly, one or more spatial parameters could define the measured position and orientation of a feature of the workpiece, representing the changes in the position and orientation (distances and angles) between the current location and orientation of the feature and the reference values for the feature. The position and orientation measurements are then compared to predetermined position and orientation values, with the comparison result being used to adjust the position of the workpiece.

The workpiece preferably corresponds to an integrally bladed rotor or other gas turbine engine component. More specifically, the current target area of the workpiece preferably includes at least one of a leading edge section and a trailing edge section of an airfoil in the integrally bladed rotor.

The data processing step, according to one form thereof, further includes evaluating the spatial parameter to calculate a possible shift in the position of the workpiece from the current processing position which would be sufficient to enable optimal laser shock processing of the workpiece at the current target area. This optimal laser shock processing, according to a preferred form thereof for two-sided processing, involves applying a first energy signal having an energy density to a first impact area of the workpiece and applying a second energy signal having an energy density substantially equal to the energy density of the first energy signal to a second impact area of the workpiece, wherein the first impact area and the second impact area are substantially equal and are disposed substantially opposite to one another.

The invention, in another form thereof, is directed to a method of processing a workpiece. According to the method, a part program is provided which defines a plurality of sequential processing positions. The workpiece is positioned at a current one of the sequential processing positions. Position data is provided that defines at least one spatial parameter which characterizes a positional arrangement of a current target area of the workpiece, wherein the current target area is respectively associated with the current processing position. The position data is processed to evaluate the spatial parameter in relation to predetermined criteria. The position of the workpiece is adjusted in accordance with the evaluation results. The workpiece is laser shock processed at the current target area following the position adjustment step. The workpiece is then positioned at a next current one of the sequential processing positions, and the foregoing steps are repeated until the part program is finished.

The invention, in another form thereof, is directed to a method of processing a workpiece. According to the method, the workpiece is positioned at a current processing position, wherein the current processing position is associated with a current target area of the workpiece, and the current target area of the workpiece has a target position value associated therewith that represents the position thereof. A difference measurement is generated which indicates the variation of the position of the current target area of the workpiece from a reference target position, using the target position value. The position of the workpiece is adjusted in accordance with the difference measurement so as to enable the position of the current target area, following positional adjustment of the workpiece, to substantially match the reference target position. Laser shock processing of the workpiece is performed at the current target area following the position adjustment step.

The invention, in another form thereof, is directed to a method of processing a workpiece. According to the method, a workpiece is positioned at a current processing position. Position data is provided that defines at least one spatial parameter which characterizes a positional arrangement of a current target area of the workpiece, wherein the current target area is associated with the current processing position. The position data is processed to generate position adjustment data based thereon which represents a possible displacement of the workpiece from the current processing position to another position where optimal laser shock processing of the current target area can occur. The position of the workpiece is adjusted in accordance with the generated position adjustment data. The workpiece is then laser shock processed at the current target area following the position adjustment step.

The invention, in yet another form thereof, is directed to a method of processing a workpiece. According to the method, the workpiece is positioned at a current processing position. Position data is generated that defines at least one spatial parameter which characterizes a positional arrangement of a current target area of the workpiece, wherein the current target area is associated with the current processing position. The generated position data is compared to predetermined reference data. The position of the workpiece is then adjusted in accordance with the comparison results. Laser shock processing of the workpiece is performed at the current target area following the position adjustment step.

The invention, in yet another form thereof, is directed to a method of processing a workpiece. The workpiece is positioned at a current processing position, wherein the current processing position is associated with a current target area of the workpiece. A determination is made of a position adjustment for the workpiece from the current processing position to an adjusted processing position which would be effective in arranging the workpiece so as to enable the current target area of the workpiece to undergo laser shock processing satisfying predetermined criteria. The position of the workpiece is then adjusted in accordance with the position adjustment determination. The workpiece is laser shock processed at the current target area following the position adjustment step.

One advantage of the present invention is that the laser shock processing treatment is not subject to the limitations that attend the hard-coded positioning of conventional part programs since dynamic feedback enables the current target area to be dynamically repositioned for optimal processing.

Another advantage of the present invention is that the workpiece can be continuously evaluated on a shot-to-shot basis to ensure that each laser firing repetition produces optimal processing of the workpiece or otherwise satisfies a selected performance criteria.

A further advantage of the present invention is that the laser shock processing treatment is made more efficient by ensuring that the laser hits the intended target area.

A further advantage of the present invention is that the otherwise deleterious effects of distortion and deformation are ameliorated by dynamically repositioning the workpiece in response to the detection of such distortive features, thereby serving to compensate for the presence of the distortion.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
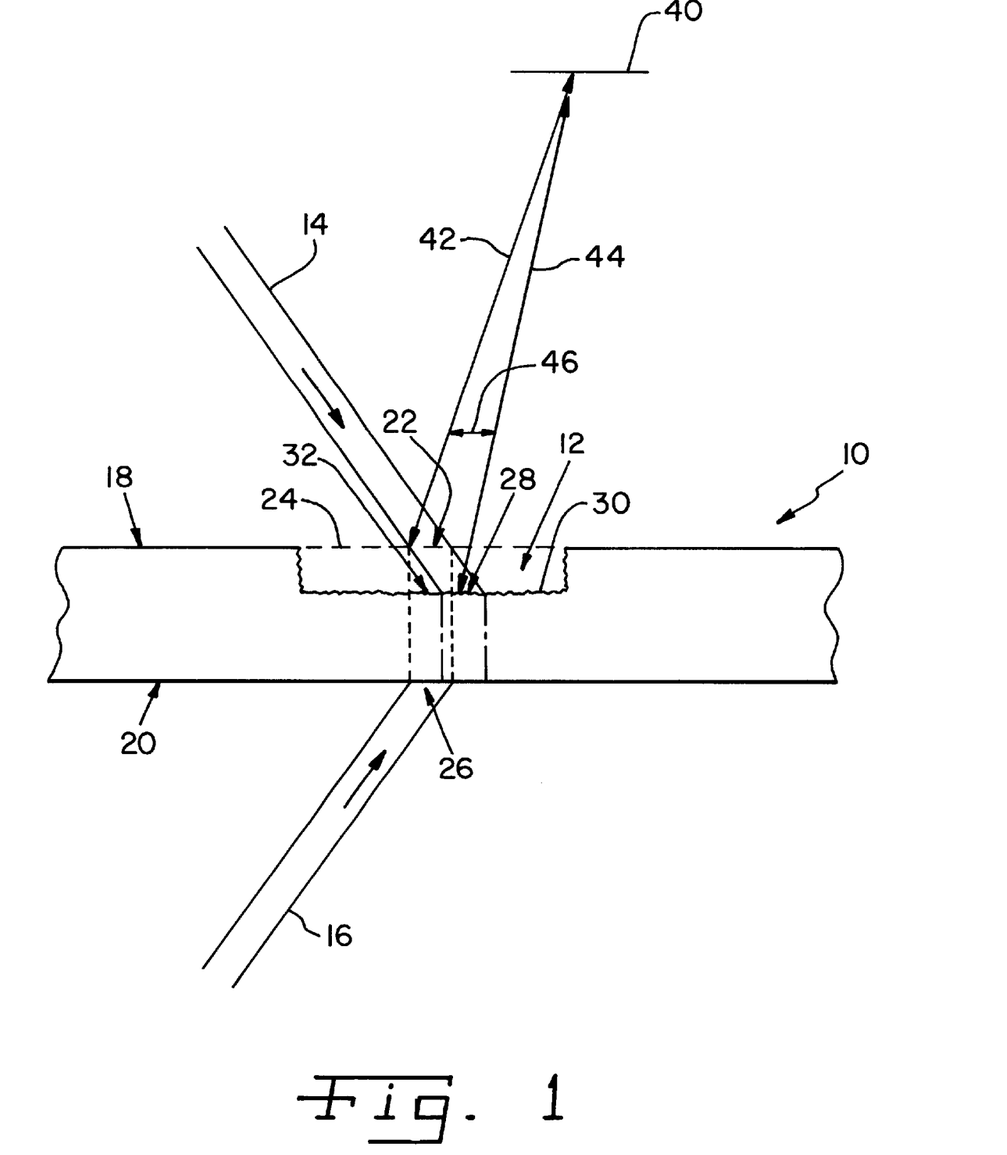
FIG. 1 is a schematic view of a representative workpiece illustrating in exaggerated form a type of distortion for which the method of the present invention provides compensation.

Referring now to the drawings and particularly to FIG. 1, there is shown a representative workpiece 10 illustrating in exaggerated view a type of distortion provided in the form of recess 12 for which the present invention provides compensation, as discussed in further detail below. The effect of such distortion is evident in conjunction with illustrative laser beams 14 and 16 that are directed at respective opposing sides 18 and 20 of workpiece 10 to perform a conventional laser shock processing operation.

In the absence of any distortion and the accompanying formation of recess 12, upper laser beam 14 would strike the surface of upper side 18 and form thereon incident spot 22 as shown in relation to the phantom extension 24 of side 18 over recess 12. At the opposing side of workpiece 10, the lower laser beam 16 would strike the surface of lower side 20 and form thereon incident spot 26. As shown, this type of laser shock processing is desirable since the laser beam incident spots 22 and 26 are disposed substantially opposite to one another and have substantially equal areas, enabling the resulting compressive residual stresses induced by each incident spot to be substantially matched.

However, once the distortion is introduced in the form of recess 12, the respective incident spots become misaligned, thereby leading to a mismatch in the compressive residual stress regions. As shown, laser beam 14 will form an incident spot 28 on the lower surface 30 of recess 12 at upper side 18 that is misaligned with the laser beam spot 26 formed at lower side 20. This misalignment produces an unbalanced and asymmetrical set of compressive residual stress regions that can lead to further distortion in workpiece 10.

Figure 2:
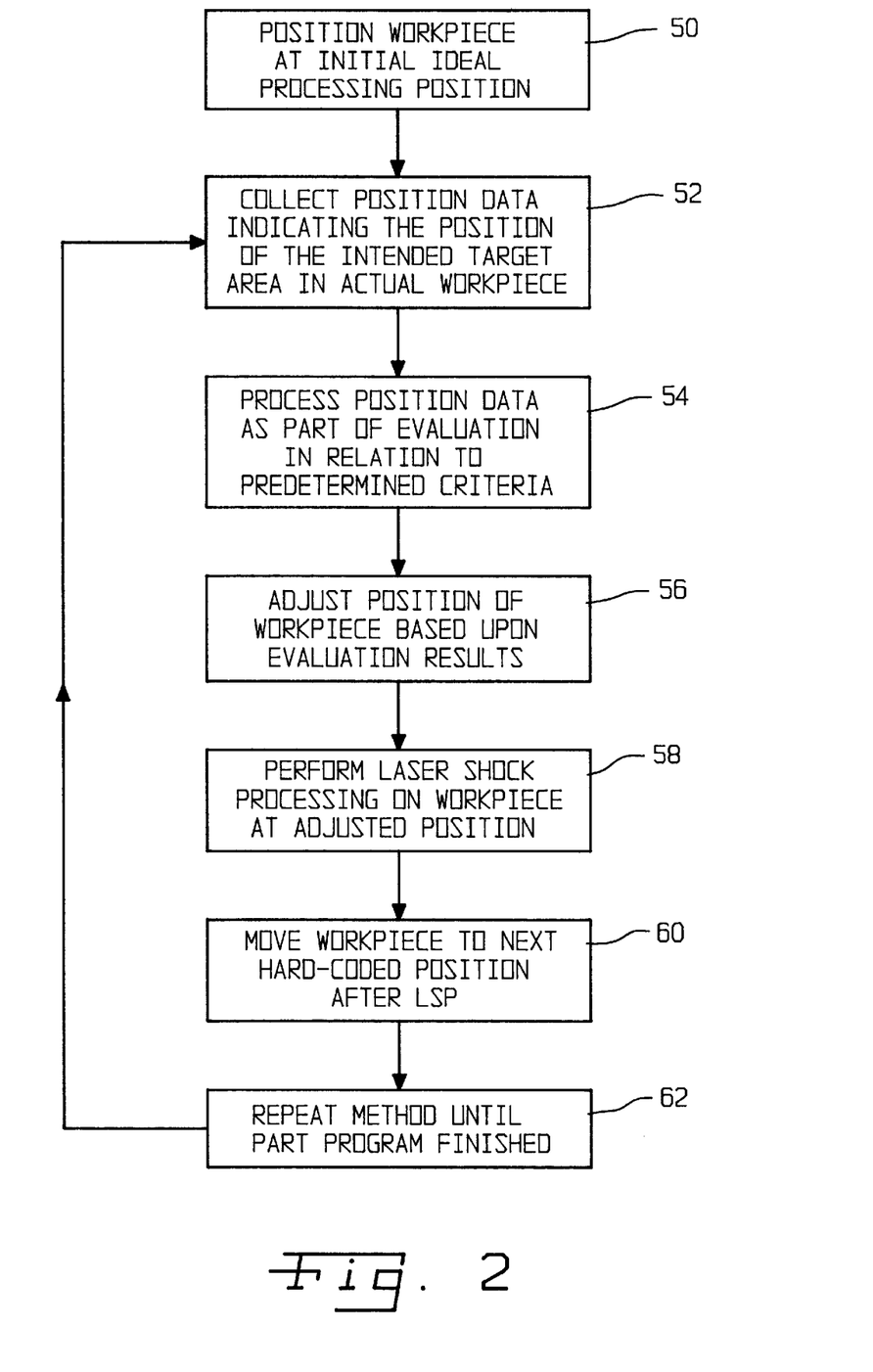
FIG. 2 is a flow chart of the method of the present invention.

Reference is now made to the flowchart illustrated in FIG. 2 for a discussion of the present invention. As conventionally understood, a part program is developed that includes a sequence of fixed, preprogrammed processing positions that represent the series of locations that the workpiece will occupy during each stage of the laser shock processing operation. For this purpose, there is conventionally provided a part manipulator capable of executing the part program and receiving additional positioning instructions. As conventionally understood, the parameters for the laser shock processing operation are tailored to a corresponding workpiece geometry ("ideal workpiece"). Accordingly, the part program is developed based upon the same workpiece geometry.

At the outset, the workpiece under production ("actual workpiece") is loaded into the part handling system and then positioned to the initial ideal processing point as indicated by the part program (50). Position data is then collected which facilitates determining a measure of the variation in position of the current target area of the actual workpiece from a corresponding target area in the ideal workpiece (52).

For example, referring to FIG. 1, a first distance measurement 42 measures the distance between a reference point 40 and side 18 within the intended target area in relation to an ideal workpiece, i.e., a part having no distortion. This first distance measurement 42 is typically provided as predetermined information or processing criteria and not a real measurement. A second distance measurement 44 measures the distance between reference point 40 and side 18 within the intended target area in relation to the actual workpiece, i.e., the part under production exhibiting the recess-type distortion 12. The variation between first and second distance measurements 42 and 44 is illustratively represented by positional variance measurement 46.

Figure 3:
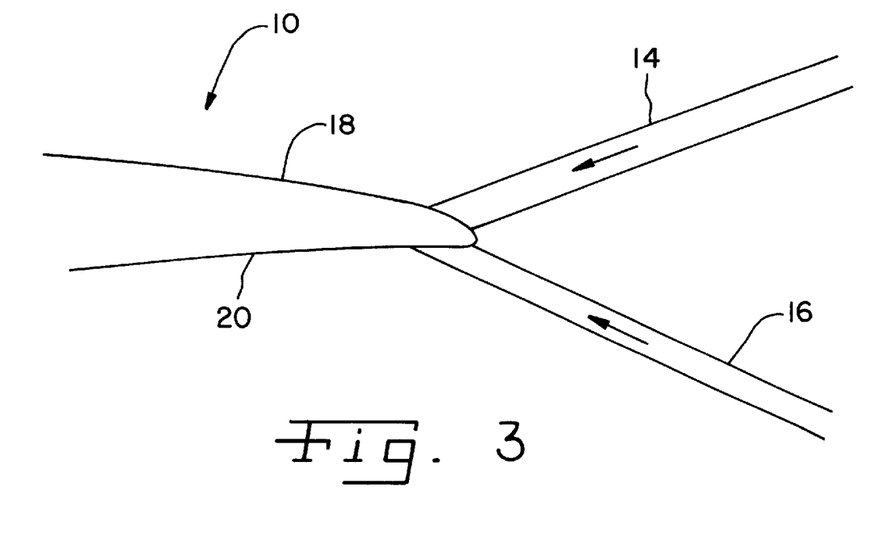
FIG. 3 is a schematic view of an airfoil illustrating properly aligned laser beams on the edge of the airfoil whereby the laser beams impact the airfoil at oblique angles.

Reference is now made to FIG. 3, which illustrates the proper alignment of two laser beams on the edge of an airfoil 10. Laser beams 14, 16 are incident on opposite sides 18, 20 of the airfoil 10. In this example the laser beams are illustrated to impact the surfaces 18, 20 of the airfoil 10 at oblique angles. Oblique angles may be required because of interference with other features of the workpiece, e.g. adjacent airfoils of an integrally bladed rotor.

Figure 4:
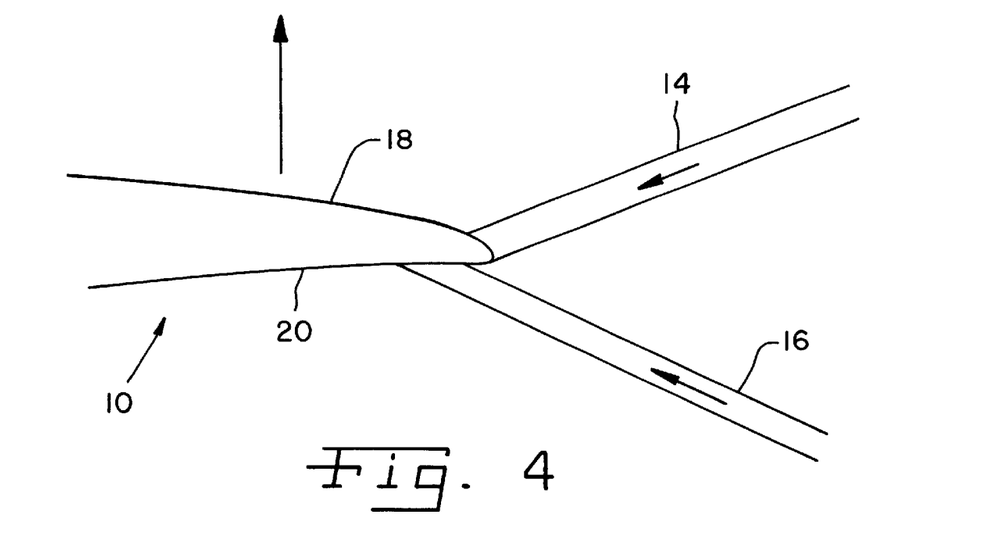
FIG. 4 is the airfoil of FIG. 4 illustrating the severe misalignment of the laser beams that can occur with only a small shift in the positioning of the airfoil.

Reference is now made to FIG. 4, which illustrates a misalignment of two laser beams on the edge of an airfoil 10 in the upward direction 34. Laser beams 14, 16 are incident on opposite sides 18, 20 of the airfoil 10, but are now misaligned and will not produce optimum laser shock processing effects. In this example, a small positioning error of a fraction of a millimeter, in the upward direction 34 can cause a very significant misalignment of laser beams 14, 16 on airfoil 10.

The manner of acquiring the position data on the current target area of the actual workpiece can be accomplished with any number of mechanisms known to those skilled in the art. For example, ranging systems may be used that include video imaging apparatus, laser positioning equipment, and/ or mechanical gages. Additionally, the reference point 40 used in providing the various target distance measurements may be any suitable point such as a specific location on: the workpiece, the base which supports the workpiece, the part manipulator, the distance measurement device, or the laser apparatus.

The collected position data is then processed in order to perform an evaluation in view of predetermined criteria (54). For example, the first distance measurement 42 is compared to the second distance measurement 44 to arrive at a difference value represented by variance measurement 46. This variance measurement 46 represents the degree of compensation needed in the spatial arrangement of the actual workpiece in order to enable optimal laser shock processing to be achieved. In particular, this measure of compensation effectively represents the manner and degree to which the actual workpiece needs to be repositioned in order for the current target area to occupy a position commensurate with the ideal position, thereby aligning the target area with its counterpart in the ideal workpiece. Referring to FIG. 1, proper repositioning of the workpiece according to the present invention would enable the laser beam 14 to impact workpiece 10 in the desired location, namely, at illustrative beam spot area 32 disposed substantially opposite beam spot 26 and having substantially the same sizes.

In one embodiment, a triangulation method is used to determine the adjusted position of the workpiece. Using this method, several points in space are fixed and others are determined using geometric analysis. For example, the position of the base and measuring device are known, while the distance between the measuring device and actual workpiece is determined using triangulation analysis. It should be apparent, however, that any type of measurement system may be used.

The position of the actual workpiece is then adjusted in response to and in accordance with the variance measurement 46 (56). In particular, the variance measurement 46 is translated into a suitable command that instructs the part manipulator to move the workpiece from its current hard-coded position (defined by the part program) to the adjusted part processing position. At this juncture, the current target area in the as-adjusted workpiece is now ready for optimal laser shock processing.

The laser shock processing operation is then carried out in relation to the current target area following repositioning of the workpiece (58). After the laser shock processing is finished, the workpiece is then moved to its next sequential hard-coded position as indicated by the part program (60). The method indicated by steps 52–60 is repeated for each one of the hard-coded part processing positions until the part program is finished (62).

It should be clear that in less critical applications it may not be necessary to make adjustments between each processing step. For example, some parts may require that a single location (spot) be processed with more than one laser shot. In this case, the part may be positioned and adjusted only once, even though more than one laser peening step is required.

As described herein, a methodology has been proposed that permits dynamic feedback in part processing to enable the part to be repositioned for optimum processing. This could be done either on a shot-to-shot basis or as a pre-processing step between processing layers. At a basic level, this method would allow processing of parts to continue without time-consuming reprogramming of part programs between processing layers or individual shots. The predetermined part program is itself not modified; rather, adjustments are made (if necessary) after the workpiece has been moved to its hard-coded processing position. Extrapolation of the method would allow for a generic processing criteria to be used as an input processing parameter to guide the evaluation effort in selecting the desired positional arrangement of the target area, thereby allowing the processing system to dynamically develop the part-processing program.

The invention finds particular use in an airfoil (blade) of an integrally bladed rotor (IBR) for a gas turbine engine. Because the blade cannot be laser peened off of the rotor, the entire rotor must be positioned into the peening cell and the laser beams aligned onto each individual airfoil. Because the airfoils are positioned close together, the laser beams must typically impinge the airfoil at an oblique angle. The invention can be used to actively track the edge of an airfoil during laser peening, whether it is during the initial processing sequence or later sequences.

The invention may incorporate an operation-specific, pre-processing step that follows the step of moving the workpiece to its hard-coded processing position but precedes the step of repositioning the workpiece in accordance with the target area measurement data. In particular, parameters such as spacing between spots, distance to certain airfoil edges, and angle of incidence may be entered into the part positioning system to move the workpiece using these parameters.

It should be noted that more than one reference point could be used for a workpiece. For example, it may be desirable to laser peen a row of spots at a certain distance from a feature of the workpiece. As a specific example, a row of spots may be applied at a fixed distance from the edge of a gas turbine engine blade and the reference point may be the edge of the blade. The reference point would then be different for each spot location along the blade. Note that in this specific example the part program may now be substantially the same for different types of blades, allowing the operator to provide a more generic part program (a row of spots) and a distance from the edge of the blade to process a wide variety of blades.

As discussed herein, the adjustment data is collected at the point where the laser is to hit the part, namely, the current target area. Various methods may be used to determine the amount of deviation, departure, or variation from the ideal workpiece position. This information is then used to reposition the actual workpiece so that the laser hits the part in the desired location.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of processing a workpiece, comprising the steps of:

positioning said workpiece at a current processing position;

providing position data defining at least one spatial parameter that characterizes a positional arrangement of a current target area of said workpiece, the current target area being associated with the current processing position;

processing the position data to evaluate the at least one spatial parameter in relation to predetermined criteria;

dynamically adjusting the position of said workpiece in accordance with the evaluation results in order to compensate for the presence of distortion or manufacturing variations; and laser shock processing said workpiece at the current target area following the position adjustment step.

2. The method as recited in claim 1, further comprising the step of:

repeating the steps of the workpiece processing method for each respective workpiece processing position of a predetermined sequence of positions.

3. The method as recited in claim 1, wherein the at least one spatial parameter defines a target distance measurement representing the distance between the current target area of said workpiece and a reference point.

4. The method as recited in claim 3, wherein the data processing step further comprises the step of:

comparing the target distance measurement to a predetermined distance value.

5. The method as recited in claim 4, wherein the predetermined distance value being associated with another workpiece.

6. The method as recited in claim 1, wherein the at least one spatial parameter defines a target area profile providing a geometric representation of the current target area location of said workpiece.

7. The method as recited in claim 6, wherein the data processing step further comprises the step of:

comparing the target area profile to predetermined geometry data.

8. The method as recited in claim 1, wherein said workpiece being an integrally bladed rotor.

9. The method as recited in claim 8, wherein the current target area of said workpiece including at least one of a leading edge section and a trailing edge section of an airfoil in said integrally bladed rotor.

10. The method as recited in claim 1, wherein the data processing step further includes the step of:

evaluating the at least one spatial parameter to calculate a possible shift in the position of said workpiece from the current processing position which would be sufficient to enable optimal laser shock processing of said workpiece at the current target area.

11. The method as recited in claim 10, wherein the optimal laser shock processing of said workpiece involves applying a first laser pulse having a first energy density to a first impact area of said workpiece and applying a second laser pulse having a second energy density to a second impact area of said workpiece, the first impact area and the second impact area being substantially equal and being disposed substantially opposite to one another.

12. A method of processing a workpiece, comprising the steps of:
(i) providing a part program defining a plurality of sequential processing positions;
(ii) positioning said workpiece at a current one of said plurality of sequential processing positions;
(iii) providing position data defining at least one spatial parameter that characterizes a positional arrangement of a current target area of said workpiece, the current target area being respectively associated with the current processing position;
(iv) processing the position data to evaluate the at least one spatial parameter in relation to predetermined criteria;
(v) dynamically adjusting the position of said workpiece in accordance with the evaluation results in order to compensate for the presence of distortion or manufacturing variations;
(vi) laser shock processing said workpiece at the current target area following the position adjustment step;
(vii) positioning said workpiece at a next current one of said plurality of sequential processing positions; and
(viii) repeating steps (iii) through (vii) until said part program is finished.

13. The method as recited in claim 12, wherein the at least one spatial parameter defines a target distance measurement representing the distance between the current target area of said workpiece and a reference point.

14. The method as recited in claim 13, wherein the data processing step further comprises the step of:
comparing the target distance measurement to a predetermined distance value.

15. The method as recited in claim 12, wherein the data processing step further comprises the step of:
evaluating the at least one spatial parameter to calculate a possible shift in the position of said workpiece from the current processing position which would be sufficient to enable optimal laser shock processing of said workpiece at the current target area.

16. The method as recited in claim 15, wherein the optimal laser shock processing of said workpiece involves applying a first laser pulse having a first energy density to a first impact area of said workpiece and applying a second laser pulse having a second energy density to a second impact area of said workpiece, the first impact area and the second impact area being substantially equal and being disposed substantially opposite to one another.

17. The method as recited in claim 12, wherein said workpiece being an integrally bladed rotor.

18. The method as recited in claim 17, wherein the current target area of said workpiece including at least one of a leading edge section and a trailing edge section of an airfoil in said integrally bladed rotor.

19. A method of processing a workpiece, comprising:
positioning said workpiece at a current processing position, the current processing position being associated with a current target area of said workpiece, the current target area of said workpiece having a target position value associated therewith representing the position thereof;
providing a difference measurement indicating the variation of the position of the current target area of said workpiece from a reference target position, using the target position value;
dynamically adjusting the position of said workpiece in accordance with the difference measurement in order to compensate for the presence of distortion or manufacturing variations so as to enable the position of the current target area, following positional adjustment of said workpiece, to substantially match the reference target position; and
laser shock processing said workpiece at the current target area following the position adjustment step.

20. The method as recited in claim 19, wherein the reference position being defined by a target area in another workpiece.

21. The method as recited in claim 19, further comprising the step of:
repeating the steps of the workpiece processing method for each respective workpiece processing position of a predetermined sequence of positions.

22. The method as recited in claim 19, wherein said workpiece being an integrally bladed rotor.

23. The method as recited in claim 22, wherein the current target area of said workpiece including at least one of a leading edge section and a trailing edge section of an airfoil in said integrally bladed rotor.

24. A method of processing a workpiece, comprising the steps of:
positioning said workpiece at a current processing position;
providing position data defining at least one spatial parameter that characterizes a positional arrangement of a current target area of said workpiece, the current target area being associated with the current processing position;
processing the position data to generate position adjustment data based thereon which represents a possible displacement of said workpiece from the current processing position to another position where optimal laser shock processing of the current target area can occur;
dynamically adjusting the position of said workpiece in accordance with the generated position adjustment data in order to compensate for the presence of distortion or manufacturing variations; and
laser shock processing said workpiece at the current target area following the position adjustment step.

25. The method as recited in claim 24, wherein the optimal laser shock processing of said workpiece involves applying a first laser pulse having a first energy density to a first impact area of said workpiece and applying a second laser pulse having a second energy density to a second impact area of said workpiece, the first impact area and the second impact area being substantially equal and being disposed substantially opposite to one another.

26. The method as recited in claim 24, further comprising the step of:
repeating the steps of the workpiece processing method for each respective workpiece processing position of a predetermined sequence of positions.

27. The method as recited in claim 24, wherein the at least one spatial parameter defines a target distance measurement representing the distance between the current target area of said workpiece and a reference point.

28. The method as recited in claim 27, wherein the data processing step further comprises the step of:
comparing the target distance measurement to a predetermined distance value.

29. The method as recited in claim 24, wherein said workpiece being an integrally bladed rotor.

30. The method as recited in claim 29, wherein the current target area of said workpiece including at least one of a leading edge section and a trailing edge section of an airfoil in said integrally bladed rotor.

31. A method of processing a workpiece, comprising the steps of:

positioning said workpiece at a current processing position;

providing position data defining at least one spatial parameter that characterizes a positional arrangement of a current target area of said workpiece, the current target area being associated with the current processing position;

comparing the position data to predetermined reference data;

dynamically adjusting the position of said workpiece in accordance with the comparison results in order to compensate for the presence of distortion or manufacturing variations; and laser shock processing said workpiece at the current target area following the position adjustment step.

32. The method as recited in claim 31, further comprises the step of:

repeating the steps of the workpiece processing method for each respective workpiece processing position of a predetermined sequence of positions.

33. The method as recited in claim 31, wherein the at least one spatial parameter defines a target distance measurement representing the distance between the current target area of said workpiece and a reference point.

34. The method as recited in claim 33, wherein the workpiece data comparison step further includes the step of:

comparing the target distance measurement to a predetermined distance value.

35. The method as recited in claim 31, wherein said workpiece being an integrally bladed rotor.

36. The method as recited in claim 35, wherein the current target area of said workpiece including at least one of a leading edge section and a trailing edge section of an airfoil in said integrally bladed rotor.

37. A method of processing a workpiece, comprising the steps of:

positioning said workpiece at a current processing position, the current processing position being associated with a current target area of said workpiece;

determining a position adjustment for said workpiece from the current processing position to an adjusted processing position which would be effective in arranging said workpiece so as to enable the current target area of said workpiece to undergo laser shock processing satisfying predetermined criteria;

dynamically adjusting the position of said workpiece in accordance with the position adjustment determination in order to compensate for the presence of distortion or manufacturing variations; and laser shock processing said workpiece at the current target area following the position adjustment step.

38. The method as recited in claim 37, further comprises the step of:

repeating the steps of the workpiece processing method for each respective workpiece processing position of a predetermined sequence of positions.

39. The method as recited in claim 37, wherein the position adjustment determination step further comprises the steps of:

providing a target distance measurement representing the distance between the current target area of said workpiece and a reference point;

comparing the target distance measurement to a predetermined distance value and generating a difference measurement representative of the comparison; and formulating the position adjustment for said workpiece in accordance with the generated difference measurement.

40. The method as recited in claim 37, wherein said workpiece being an integrally bladed rotor.

41. The method as recited in claim 40, wherein the current target area of said workpiece including at least one of a leading edge section and a trailing edge section of an airfoil in said integrally bladed rotor.

42. The method as recited in claim 37, wherein the laser shock processing which satisfies predetermined criteria involves an optimal laser shock processing operation comprising the steps of:

applying a first laser pulse having a first energy density to a first impact area of said workpiece; and applying a second laser pulse having a second energy density to a second impact area of said workpiece, the first impact area and the second impact area being substantially equal and being disposed substantially opposite to one another.

43. The method of claim 42, wherein the energy density of the first laser pulse is substantially equal to the energy density of the second laser pulse.

44. The method of claim 9, wherein the energy density of the first laser pulse is substantially equal to the energy density of the second laser pulse.

45. The method of claim 25, wherein the energy density of the first laser pulse is substantially equal to the energy density of the second laser pulse.

46. The method of claim 16, wherein the energy density of the first laser pulse is substantially equal to the energy density of the second laser pulse.

* * * * *